Dec. 13, 1966  W. E. FRIESSER  3,291,243
POWER OPERATED VEHICLE
Filed July 5, 1963  5 Sheets-Sheet 5
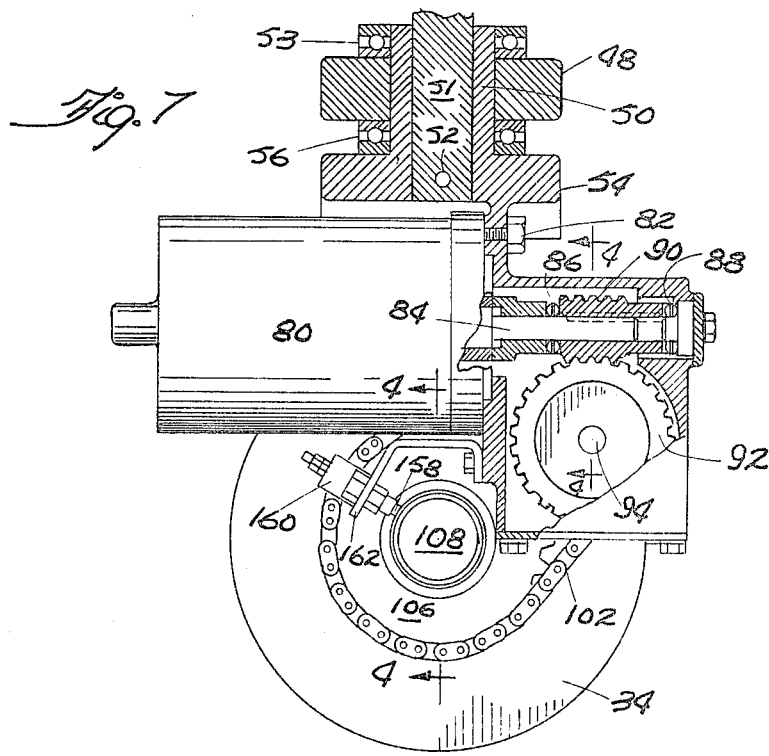
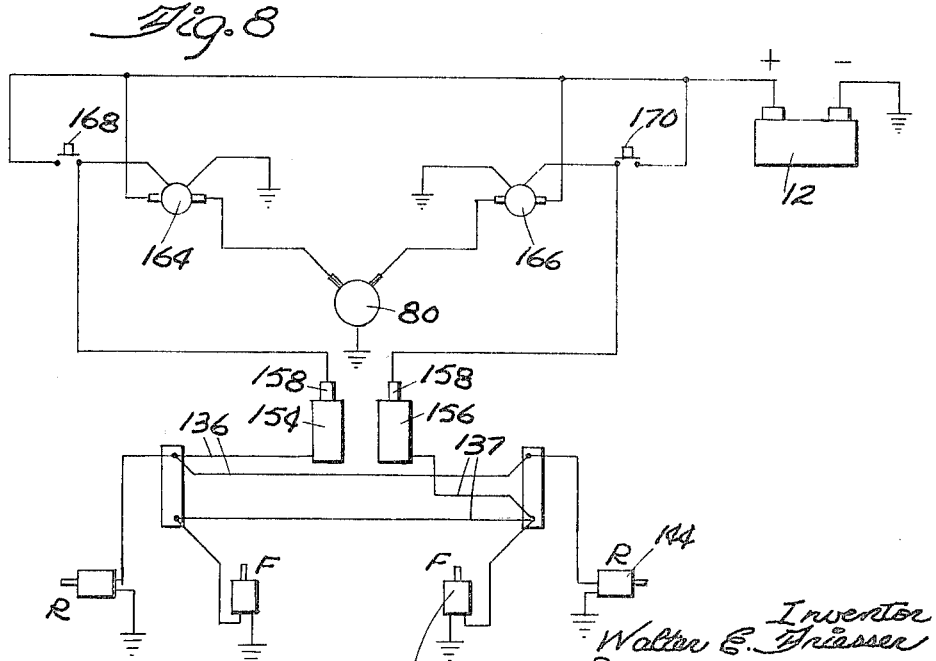
Inventor
Walter E. Friesser
By Pendleton, Neuman,
Seibold & Williams
Atty's

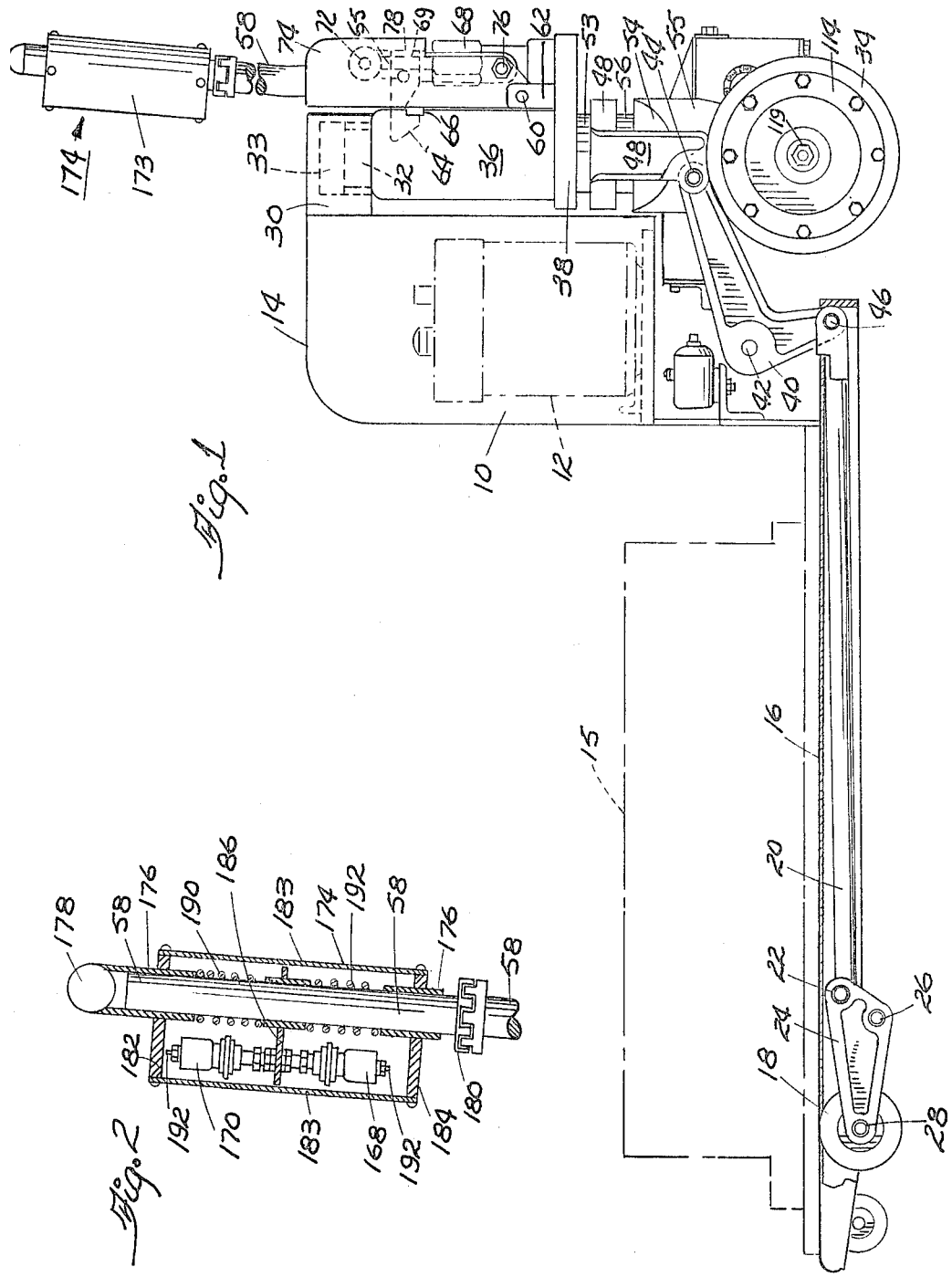

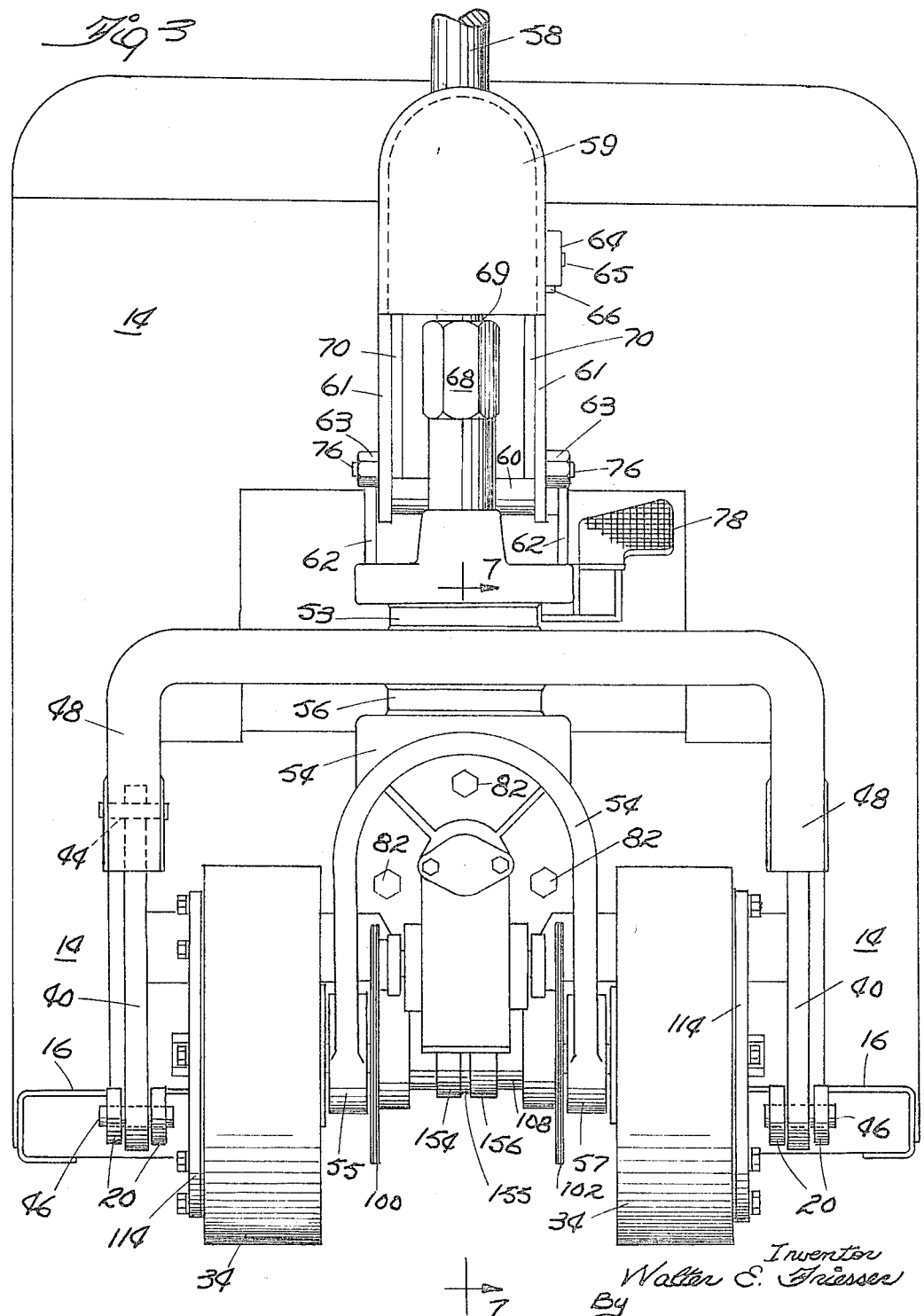

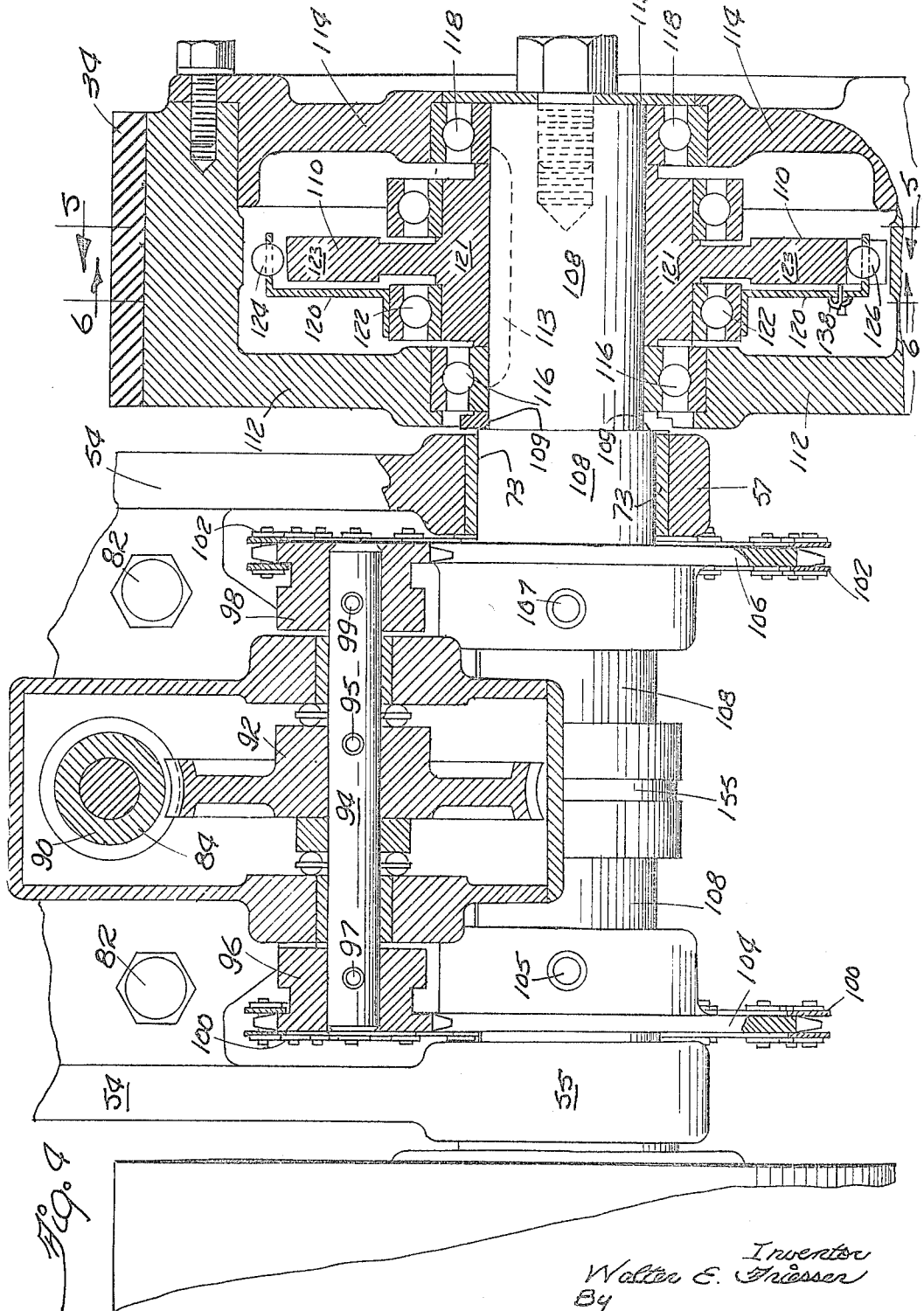

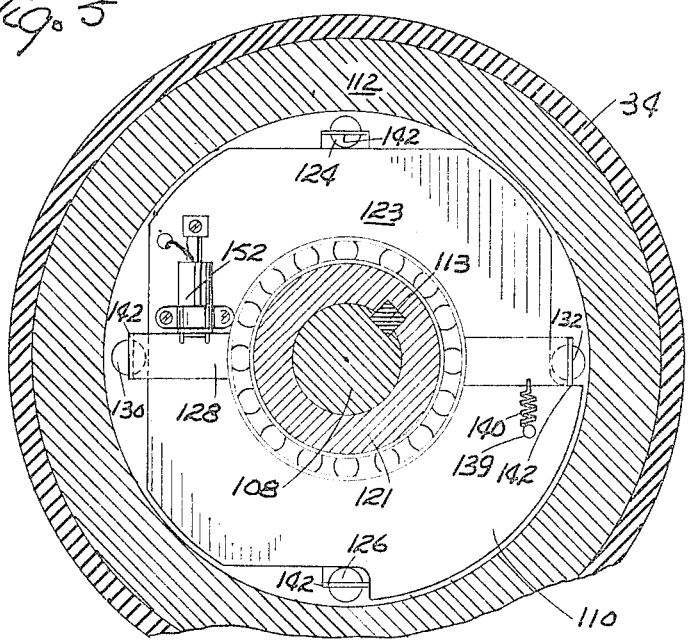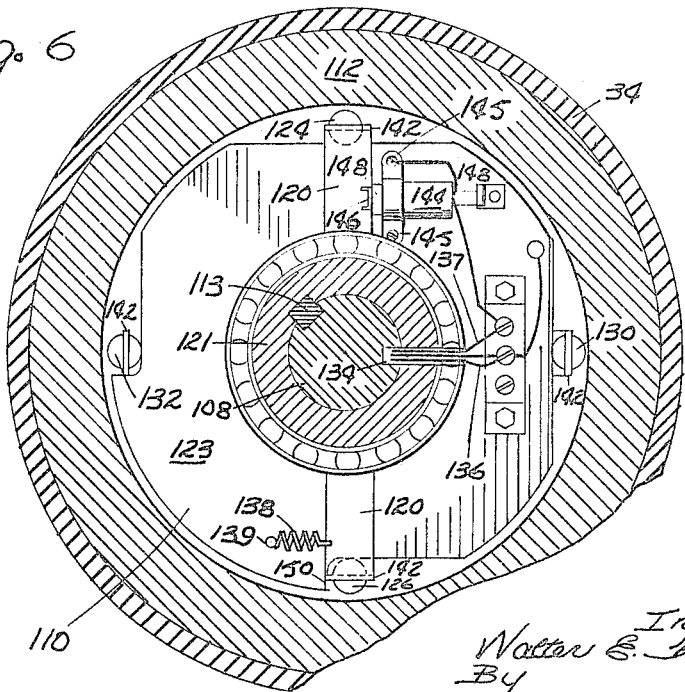

United States Patent Office 3,291,243
Patented Dec. 13, 1966

3,291,243
POWER OPERATED VEHICLE
Walter E. Friesser, Richton Park, Ill., assignor to O. F. Jordan Company, Inc., East Chicago, Ind., a corporation of Indiana
Filed July 5, 1963, Ser. No. 293,035
14 Claims. (Cl. 180—19)

This invention relates to industrial trucks and the like and more particularly to a manual truck which is adapted for intermittent drive by an electric motor, commonly referred to as power assist.

Industrial trucks known in the prior art have commonly been either of the type in which all of the motive power is applied manually, or else of the type in which all of the motive power is applied mechanically by a motor or the like. The manual type of truck is, of course, difficult to handle with large loads, while the fully mechanized truck is relatively costly. In addition, when the mechanization is electrically powered from a battery, large current drains on the battery are frequently encountered, thereby shortening the battery life and requiring frequent battery recharging and replacement.

In at least one industrial truck of the prior art, however, the operation of the truck is primarily manual, but an electric motor is provided for assisting the operator in response to the speed of the truck and to the amount of pull on the truck handle by an operator, so that the motor circuit is energized only when more than a predetermined force is applied by the operator, and a predetermined speed is not exceeded. This truck requires provision of a friction actuated speed-responsive device, however, which adds to the complexity and cost of the truck, and detracts markedly from its reliability, because of variations in operation in response to temperature, the quality of lubrication employed for the speed-responsive device, and the like. Moreover, this prior art truck employs a clutch interconnecting the electric motor with the drive wheels which is dependent upon a high initial torque of the electric motor. Frequently, however, the torque of the motor is insufficient to actuate the clutch.

Accordingly, it is a principal object of the prevent invention to provide an industrial truck equipped with an improved clutch.

It is another object of the present invention to provide an industrial truck having an electric motor adapted to intermittently assist the operator by applying driving power to the truck, irrespective of its speed.

A further object of the present invention is to provide a truck having a clutch operative by electromechanical means mounted in fixed relation with the driving member of the clutch.

These and other objects and advantages of the present invention will become manifest upon examination of the accompanying specification, claims and drawings.

In one embodiment of the present invention, there is provided an industrial truck of the fork-lift variety having a frame supported by a plurality of wheels, with provision for raising and lowering the fork with respect to the load to be carried by the truck. A drive assembly is located at one end of the truck and is pivotally supported in relation to the frame. The drive assembly includes an electric motor, a transmission, a pair of drive wheels, and a clutch interconnected between the transmission and each of the drive wheels. The handle of the truck is connected to a yoke supported by the drive assembly for pivoting the drive assembly and drive wheels with respect to the frame. The truck may be urged in one direction or the other by pushing or pulling on the handle, thereby to transmit a motive force to the truck. Switch means mounted on the handle is responsive to a given force transmitted through the handle to close an electrical circuit including the motor and a battery, and to engage the clutches to apply power to the drive wheels in either a forward or reverse direction in accordance with the direction of force transmitted through the handle. The handle is also connected to a hydraulic pump means which is adapted to pump hydraulic fluid into a jack to raise the body of the truck when the handle is pumped up and down.

The clutch interconnecting the motor and each of the drive wheels is provided with a pair of solenoids mounted for rotation with the driving member of the clutch, and adapted to control the position of a plurality of balls, to selectively cause the balls to be wedged between driving and driven members of the clutch.

Reference will now be made to the accompanying drawings in which:

FIG. 1 is a side elevation of an industrial truck embodying the present invention;

FIG. 2 is a vertical cross section taken through a portion of the handle of the truck;

FIG. 3 is a rear elevation of the truck illustrating the driving wheels;

FIG. 4 is a vertical cross section taken along the lines 4—4 of FIG. 7;

FIG. 5 is a vertical cross section of a portion of the wheel assembly taken along the line 5—5 of FIG. 4;

FIG. 6 is a vertical cross section of a portion of the wheel assembly taken along the line 6—6 of FIG. 4;

FIG. 7 is a side elevation, partly broken away and partly in cross section, of the drive assembly of the truck of FIG. 1, taken along the line 7—7 of FIG. 3; and FIG. 8 is a wiring diagram for the electrical system employed with the truck of FIG. 1.

Referring now to the drawings, and more particularly FIG. 1, there is illustrated an industrial truck having a battery compartment 10 for receiving a battery 12 supported by a frame 14. A pair of fork members 16 (only one of which is shown in FIG. 1) are secured to and extend forward from the frame 14 to support a load 15, and each is supported at its forward extension by a wheel 18 which is adapted to be raised and lowered by longitudinal movement of a rod 20. The rod 20 is pivotally connected by a pin 22 to one leg of a bell crank 24 which is pivotally connected to the fork 16 by a pin 26. The wheel 18 is rotatably mounted on a shaft 28 secured to another leg of the bell crank 24. It is thus seen that longitudinal forward (or leftward as seen in FIG. 1) movement of the rod 20 causes the bell crank to swing counterclockwise about the pin 26, thereby to raise the forward ends of the forks 16. It will be appreciated that a like linkage is provided for the other wheel 18 (not shown) on the other side of the frame 14.

The frame 14 is provided at its rear end with a yoke 30 rotatably mounted on a column 32, and supported by a bearing assembly 33 mounted on the column. The column 32 is part of the drive assembly 34, and is adapted to extend vertically directly over the axle of the drive wheels 34, so that the entire drive assembly may be pivoted with respect to the frame 14 and the forks 16 about a vertical axis coextensive with the axis of the column 32. The column 32 is in actuality the piston of a hydraulic jack having a cylinder 36 supported by a platform 38. As the piston 32 of the jack is raised, the rear end of the frame 14 is forced into raised position by the upward movement of the jack piston 32. The bell crank 40 is pivotally connected to the frame 14 by a pin 42, and one of its legs is pivotally connected to a yoke 48 of the drive assembly by a pin 44. Another leg of the bell crank 40 is pivotally connected to the rear end of the rod 20, by a pin 46. Thus, as the jack piston 32 causes the rear end of the frame 14 to be raised, the shaft 42 is raised with the frame 14 thereby causing the bell crank 40 to be rotated about the pin 44, and the rod 20 which is pivotally secured to the bell crank 40 by a pin 46 is urged longitudinally forward simultaneously with the lifting of the rear end of the frame 14, which, as described above, lifts the front end of the frame.

The configurations of the bell cranks 24 and 40 are such as to maintain the upper surface of the forks 16 substantially horizontal as each end of the frame 14 is raised and lowered.

The pin 44 connects the bell crank 40 to a yoke 48, which is rotatably mounted on a hollow boss 50 which extends vertically from a drive assembly frame 54 (FIG. 7). A shaft 51, connected to the platform 38, is disposed within the boss 50 and is pinned by a pin 52 to the drive assembly frame 54. The drive assembly frame 54 is in the shape of an inverted U, having downwardly extending legs 55 and 57 (FIG. 4). A pair of thrust bearing assemblies 53 and 56 are respectively disposed above and below the yoke 48 surrounding the boss 50, and support the yoke 48 and the platform 38 on the frame 54.

In order to facilitate guiding the truck, a handle 58 is provided with a yoke 59 (FIG. 3) having a pair of arms 61 extending parallel to each other, which are pivotally connected to a shaft 60, journaled in a pair of upstanding members 62, which are secured to the platform 38. A latch member 64, pivotally connected to one of the arms 61 by a pin 65 (FIG. 1), cooperates with a transversely extending bar 66 secured to the jack cylinder 36, to enable the handle 58 to be latched in an upward position as illustrated in FIG. 1. The handle 58 may be unlatched by simply lifting the latch member 64 from the bar 66.

The handle 58 is operatively connected to a hydraulic pump which powers the jack 36, and which comprises a cylinder 68 in which a piston (not shown) is mounted. The piston is secured by a connecting rod 69 to a shaft 72, which is pivotally connected at each of its ends to the upper end of one of a pair of link members 70. The lower end of each link member 70 is pivotally connected to one of the arms 61 by a pair of bolts 76, secured to the arms 61, and having nuts 63 outwardly of the link members 70. As the handle 58 is lowered (rotated clockwise as seen in FIG. 1), the bolts 76 rotate clockwise about the shaft 60, to lower the lower end of the link members 70. This also lowers the shaft 72 and the connecting rod 69, whereby the piston is forced downward in the cylinder 68. Repeated lowering and raising of the handle 58 causes the piston to pump hydraulic fluid, and the fluid is transferred from a port in the cylinder 68 to the jack cylinder 36 by conduit and valve means well known in the prior art, to raise the jack piston 32 relative to its cylinder 36. A foot pedal 78 is provided near the front of the machine to enable the operator to open a valve to permit fluid to flow from the jack cylinder 36 to lower the frame 14.

Referring now to FIG. 7, the drive arrangement of the drive assembly is illustrated. An electric motor 80 is bolted to the drive assembly frame 54 by bolts 82, and the drive shaft 84 of the motor is journaled in bearings 86 and 88, and turns a worm 90 in engagement with a gear 92. The gear 92 is keyed to a shaft 94 by a key 95 (FIG. 4). A pair of sprockets 96 and 98 (FIG. 4) are also keyed to the shaft 94 by keys 97 and 99. The sprockets 96 and 98 are in engagement with a pair of chains 100 and 102, respectively, which also engage a pair of larger sprockets 104 and 106, respectively, pinned to an axle 108 by pins 105 and 107. The motor 80 is therefore adapted through its intermeshing gears and chains to drive the axle 108.

The axle 108 is supported in a pair of sleeve bearings 73 disposed in the lower ends of the legs 55 and 57 of the housing 54. The axle 108 is provided at each end with a shoulder 109, against which a thrust washer 111 is seated. A clutch is provided for each wheel, comprising a driving member 110 keyed by a key 113 to the axle 108, and a driven clutch member, which forms the wheel rim 112 and an end cover 114 bolted to the rim 112, which are rotatably mounted on the axle 108 by the bearings 116 and 118. The driving member 110 has a tubular portion 121 mounted on the axle 108, and a flange portion 123 extending radially therefrom. The flange 123 is provided with spaced recesses for accommodating clutching elements in the form of solid balls or rollers of high strength material. A washer 119 is bolted to each end of the axle 108 to maintain the clutch and wheel assembly in alignment.

A first ball holder 120 is rotatably mounted on the tubular portion 121 by bearings 122, and is adapted to hold a suitable number of balls 124 and 126 in a predetermined position in the recesses between the flange 123 and the rim 112. The operation of the clutch can perhaps be understood more readily by examination of FIGS. 5 and 6, which show, respectively, the outside and inside views of the clutch assembly. The ball holder 120 is illustrated in FIG. 6, and another ball holder 128 (FIG. 5) is disposed transversely with respect to the ball holder 120 on the opposite side of the flange portion 123, and is adapted to support balls 130 and 132 at a predetermined position between the flange portion 123 and the rim 112.

As shown in FIG. 6, an open keyway 134 is cut in the axle 108, and contains wires 136 and 137 which are adapted to convey electrical signals for actuating the clutch in forward and reverse directions, respectively. The ball holders 120 and 128 are maintained in the position illustrated in FIGS. 5 and 6 by a pair of springs 138 and 140 extending between a pin 139 secured to the driving member 110 and the ball holders 120 and 128 respectively. Each of the ball holders has secured to its outward end a member 142 disposed generally parallel to the interior surface of the rim 112, and provided with a circular aperture slightly larger than the diameter of its ball. Thus, the balls supported by the ball holders are maintained in the angular position controlled by the ball holder, and project on each side of the member 142.

A solenoid 144 is secured to one side of the flange 123 by screws 145, and its plunger 148 bears against an upstanding member 146 connected to the ball holder 120. When the solenoid 144 is energized, it is operative to push the ball holder 120 away from it (thereby urging it in a counterclockwise direction as seen in FIG. 6). When this occurs, the balls 124 and 126 are also moved counterclockwise and soon reach a position in which they are wedged between the flange 123 and the rim 112. If the flange 123 is rotated in a clockwise direction relative to the rim 112, the balls 124 and 126 become wedged in-between the member 110 and the rim 112 and insure a positive mechanical contact therebetween. Friction maintains the balls 124 and 126 in position after actuation of the solenoid 144, and the solenoid may be de-energized, the balls 124 and 126 remaining wedged in actuated position, against the urging of the spring 138. In order to disengage the clutch, it is only necessary for the rim 112 to override the driving member 110 by moving clockwise (as seen in FIG. 6) with respect to the flange 123. This urges the balls 124 and 126 in a clockwise direction, as seen in FIG. 6 with respect to the driving member 110, and they soon become disengaged from between the driving and driven clutch members 110 and 112. The spring 138 then returns them, with their ball holder 120, to the position shown in FIG. 6. The relative clockwise rotation of the rim 112 may be accomplished either by shutting off the motor or by accelerating the truck to a speed which is in excess of the no-load speed of the motor 80.

The balls 124 and 126 cannot become engaged between the driving and driven clutch members 110 and 112 for driving the rim 112 in the opposite direction because the abutment 150 of the driving member 110 prevents the ball holder 120 from rotating clockwise relative to the driving member any further than the position illustrated in FIG. 6.

Clutching is accomplished in the opposite direction by the action of the ball holder 128, disposed on the opposite side of the flange 123, the operation of which is substantially identical to that described in connection with the ball holder 120. The difference is that actuation of the solenoid 152 urges the ball holder 128 counterclockwise as seen in FIG. 5, which direction is opposite to that in which the ball holder 120 is urged by the solenoid 144. Thus, the operation of the ball holder 128 engages the clutch by wedging between the driving member 110 and the driven member 112 when the motor axle 108 is being rotated in the opposite direction.

The solenoids 144 and 152 are actuated by electrical signals present on one or more of the wires 136 passing through the axle 108. The electrical assembly and wiring which are disposed within the wheel assembly rotate at the same speed as the axle 108 since it is keyed thereto by the key 113, and therefore no twisting of the wires 136 and 137 occurs where they emanate from the open keyway 134.

It will be appreciated that although only one clutch mechanism has been specifically illustrated and described, an identical mechanism is also provided for the other drive wheel 34.

The signals are furnished to the wires by a pair of slip rings 154 and 156 (FIG. 3) mounted on the axle 108 and insulated therefrom by an insulating bushing 155. The wires 136 and 137 communicate with the slip rings 154 and 156 through the open keyway 134, and are permanently connected thereto by soldering or the like. A pair of brushes 158 (only one of which is shown in FIG. 7) are each held in fixed relation to the housing 54 by a brush holder 156 secured to a bracket 158, which in turn is secured to the housing 54. Electrical connections are made to the brushes 158 through conductors (not shown) connected to the brush holders 160.

In FIG. 8 there is illustrated a wiring diagram of the electrical system of the truck. The negative terminal of the battery 12 is grounded, and serves as the common terminal for the electrical system, while the other terminal is connected to each of a pair of relays 164 and 166 through a pair of switches 168 and 170, respectively. Closing the switch 170 furnishes power from the battery 12 to the operating coil of the relay 166, and closes a contact which connects the positive terminal of the battery to one terminal of the motor 80, and causes the motor 80 to rotate in a direction which urges the truck forward. The switch 170 also connects the positive terminal of the battery 12 to a brush 158, which communicates with the slip ring 156. The slip ring 156 is connected to the wire 137, which in turn is connected to the solenoid 152 which functions to rotate the ball holder 128 to engage the clutch for forward movement of the truck. The wire 137 is also connected through the open keyway 134 to the clutch for the other wheel, where it is connected to the forward solenoid.

Similarly, the switch 168 energizes the control coil of the relay 164 to cause the positive terminal of the battery 12 to be connected to a second terminal of the motor 80, causing the motor 80 to be rotated in a reverse direction. The switch 168 also connects the positive terminal of the battery to the other brush 158 which communicates with the slip ring 154. The wire 136 is connected to the slip ring 154 and extends through the open keyway 134 to the solenoid 144 to energize the clutch in the reverse direction. The wire 136 also energizes the reverse solenoid of the other clutch. Accordingly, the closing of the switch 170 energizes the clutch and the motor in the forward direction, while the switch 168 energizes both the clutch and the motor in the reverse direction.

The structural details of the switches 168 and 170 are shown in FIG. 2. A housing 174 is secured to the handle 58 by being connected to a tube 176 which is slidably mounted on the handle 58 between a transverse handle member 178 and a connector 180. The housing 174 is provided with a pair of spaced end walls 182 and 184, secured to the side walls 183, and the entire housing 174 moves relative to the handle 58 as the transverse handle member 178 is pushed or pulled with respect to the truck.

Intermediate the end walls 182 and 184 a support bracket 186 is securely attached to the handle 58, and a pair of switches 168 and 170 are mounted thereon, each of the switches 168 and 170 having a switch control member 192 juxtaposed with the end walls 182 and 184. As the position of the bracket 186 is fixed with respect to the handle 58, while the end walls 182 and 184 may move in response to the force applied to the handle by the operator, the control member 192 of the switch 170 is engaged by the end wall 182 in response to pushing on the handle 58 to energize the motor in a forward direction, while the switch 168 is similarly energized by the wall 184, in response to pulling on the handle to energize the motor in the reverse direction. A pair of springs 190 and 192 are disposed about the handle 58 within the housing 174, on either side of the bracket 186, to maintain the housing disposed as shown in FIG. 2 when no force is applied to the handle 58. Thus, neither of the switches 168 and 170 is closed unless a predetermined force is applied to the truck. The necessary force required to actuate the switches 168 and 170 is controlled by the spring constant of the springs 190 and 192. As illustrated in FIG. 2, a pushing (downward) force is being applied to the handle member 178, thereby compressing the spring 190 and relaxing the spring 192. A slight additional force is required before the switch 170 can be actuated.

Although the present invention has been described specifically with respect to an industrial truck, the same may be applied to other types of material handling devices, toys, golf carts or the like, or other situations in which an inexpensive power assist mechanism is desirable for forward and reverse operation, whether intermittent or continuous.

The foregoing will so fully and completely describe the character of the present invention that others skilled in the art may, by applying current knowledge, adapt the same to use under varying conditions of service without departing from the essential features of novelty involved.

What is claimed is:

1. In a power operated vehicle a reversible clutch comprising a shaft, a driving member secured to said shaft for rotation therewith, a driven member mounted for rotation relative to said shaft and surrounding said driving member in concentricity with said shaft, said driving member having two pairs of peripherally disposed flattened portions diametrically opposite each other for accommodating clutching members in the space thereby provided between said driving and driven members, said clutching members being positioned within said space by a pair of clutch control members each normally having a first position with respect to said driving member but adapted to selectively and alternately assume a second position in which its said clutching members are brought into engagement with both said driving and driven members, whereby a driving connection is effected between said driving and driven members, and a pair of electromechanical means each for selectively causing one clutch control member to assume said second position, for rotating said driven member in one direction when said shaft is rotating in said one direction and for causing the other clutch control member to assume said second position for rotating said driven member in the opposite direction when said shaft is rotating in said opposite direction.

2. In a power operated vehicle, a clutch comprising a shaft, a driving member secured to said shaft for rotation therewith, a driven member mounted for rotation relative to said shaft and surrounding said driving member in concentricity with said shaft, said driving member having a portion extending radially outwardly from said shaft, the periphery of said driving member having a recessed portion for housing a clutch element, a clutch element holder mounted for rotation with respect to said shaft, and having a clutch element embracing portion for embracing said clutch element in said recess between said driving member and said driven member, means for limiting the movement of said clutch element holder with respect to said driving member in a first direction, resilient means urging said clutch element holder in said first direction, electromechanical means connected to said clutch element holder and operative to rotate said clutch element holder in a second direction to cause said clutch element to move out of said recess and be wedged against said driving and driven members while said driving member is rotating in said first direction, and an electrical conductor disposed in a conduit disposed in said shaft for interconnecting said electromechanical means with a source of electrical potential to actuate said clutch.

3. In a power operated vehicle, a reversible clutch comprising a driving shaft, a driving member secured to said driving shaft for rotation therewith, a driven member mounted for rotation with respect to said shaft, and surrounding said driving member in concentricity with said shaft, said driving member having a flange portion extending radially outwardly from said shaft, the periphery of said flange having two pairs of diametrically disposed recessed portions, each for housing a clutch element, a pair of clutch element holders mounted for rotation on said shaft on opposite sides of said flange, and each having a pair of clutch element embracing portions for embracing a pair of said clutch elements in a pair of said recesses between said driving member and said driven member, resilient means urging said clutch elements out of contact with said driven member, and selectively operable electromechanical means for each of said clutch element holders connected to its respective clutch element holder, and operative to rotate said clutch element holder to cause its respective clutch elements to move outwardly in said recesses and be wedged against said driving and driven members, one of said electromagnetic means being effective while said driving member is rotating in a first direction and the other said electromagnetic means being effective when said driving member is rotating in the opposite direction.

4. In a power operated vehicle, a clutch comprising a driving shaft, a driving member secured to said driving shaft for rotation therewith, a driven member mounted for rotation on said shaft, and surrounding said driving member in concentricity with said shaft, said driving member having a flange portion extending radially outwardly from said shaft, the periphery of said flange having a plurality of equally spaced recessed portions, each for housing a circular clutch element, a clutch element holder mounted for rotation on said shaft and having a plurality of clutch element embracing portions for embracing a plurality of said clutch elements individually in said recesses between said driving member and said driven member, resilient means urging said clutch element holder to a position in which said clutch elements are out of contact with said driven member, and a solenoid for said clutch element holder mounted on said flange and operative to rotate said clutch element holder relative to said flange to cause said clutch elements to move outwardly in said recesses and be wedged against said driving and driven members while said driving member is rotating in said first direction.

5. In a power operated vehicle, a reversible clutch comprising a driving shaft, a driving member keyed to said driving shaft for rotation therewith, a driven member mounted for rotation on said shaft, and surrounding said driving member in concentricity with said shaft, said driving member having a flange portion extending radially outwardly from said shaft, the periphery of said flange having two groups of equally spaced recessed portions, each for housing a ball, a pair of ball holders mounted for rotation with respect to said shaft on opposite sides of said flange, and each having a plurality of ball-embracing portions for embracing a plurality of said balls individually in the recesses of one of said groups of recesses between said driving member and said driven member, resilient means urging said ball holders to a position in which said balls are out of contact with said driven member, and a selectively operable solenoid for each of said ball holders mounted on said flange and operative to rotate its said ball holder relative to said flange to cause its respective balls to move outwardly in said recesses and be wedged against said driving and driven members, one of said solenoids being effective while said driving member is rotating in a first direction, and the other said solenoid being effective when said driving member is rotating in the opposite direction.

6. In a power operated vehicle, a reversible clutch comprising a driving shaft, a driving member keyed to said driving shaft for rotation therewith, a driven member mounted for rotation on said shaft, and surrounding said driving member in cencentricity with said shaft, said driving member having a flange portion extending radially outwardly from said shaft, the periphery of said flange having two groups of equally spaced recessed portions, each for housing a ball, a pair of ball holders mounted for rotation with respect to said shaft on opposite sides of said flange, and each having a plurality of ball-embracing portions for embracing a plurality of said balls individually in the recesses of one of said groups of recesses between said driving member and said driven member, a plurality of stop means disposed on said flange for engaging said ball holders to limit their movement with respect to said flange in a first direction, resilient means urging said ball holders against said stop means, and a selectively operable solenoid for each of said ball holders mounted on said flange and connected to its respective ball holder by a link mechanism and operative to rotate said ball holder relative to said flange to cause its respective balls to move outwardly in said recesses and be wedged against said driving and driven members, one of said solenoids being effective while said driving member is rotating in a first direction, and the other said solenoid being effective when said driving member is rotating in the opposite direction.

7. In a power operated vehicle, a reversible clutch comprising a driving shaft, a driving member keyed to said driving shaft for rotation therewith, a driven member mounted for rotation on said shaft, and surrounding said driving member in concentricity with said shaft, said driving member having a flange portion extending radially outwardly from said shaft, the periphery of said flange having two groups of equally spaced recessed portions, each for housing a ball, a pair of ball holders mounted for rotation with respect to said shaft on opposite sides of said flange, and each having a plurality of ball-embracing portions for embracing a plurality of said balls individually in the recesses of one of said groups of recesses between said driving member and said driven member, a plurality of stop means disposed on said flange for engaging said ball holders to limit their movement with respect to said flange in a first direction, resilient means urging said ball holders against said stop means, a selectively operable solenoid for each of said ball holders mounted on said flange and connected to its respective ball holder by a link mechanism and operative to rotate said ball holder relative to said flange to cause its respective balls to move outwardly in said recesses and be wedged against said driving and driven members, one of said solenoids being effective while said driving member is rotating in a first direction, and the other said solenoid being effective while said driving member is rotating in the opposite direction, and a plurality of conductors disposed in a conduit disposed in said shaft for selectively interconnecting said solenoids with a source of an electrical potential.

8. In a power operated vehicle, a reversible clutch comprising a driving shaft, a driving member keyed to said driving shaft for rotation therewith, a driven member mounted for rotation on said shaft, and surrounding said driving member in concentricity with said shaft, said driving member having a flange portion extending radially outwardly from said shaft, the periphery of said flange having two groups of equally spaced recessed portions, each for housing a ball, a pair of ball holders mounted for rotation with respect to said shaft on opposite sides of said flange, and each having a plurality of ball-embracing portions for embracing a plurality of said balls individually in the recesses of one of said groups of recesses between said driving member and said driven member, a plurality of stop means disposed on said flange for engaging said ball holders to limit their movement with respect to said flange in a first direction, resilient means urging said ball holders against said stop means, a selectively operable solenoid for each of said ball holders mounted on said flange and connected to its respective ball holder by a link mechanism and operative to rotate said ball holder relative to said flange to cause its respective balls to move outwardly in said recesses and be wedged against said driving and driven members, one of said solenoids being effective while said driving member is rotating in a first direction, and the other said solenoid being effective while said driving member is rotating in the opposite direction, a pair of slip rings secured to said driving shaft for rotation therewith and insulated therefrom for comunicating with a plurality of contact brushes, a plurality of conductors disposed in a conduit disposed in said shaft for interconnecting said slip rings and said solenoids,, and means for selectively supplying an electrical potential through said slip rings to one of said solenoids, to selectively actuate a first of said solenoids for clutching in a forward direction and a second of said solenoids for clutching in a reverse direction.

9. An industrial truck having a frame, handle means connected to said frame for transmitting a motive force applied through said handle means to said frame, a drive assembly pivotal with respect to said frame, said drive assembly comprising a plurality of drive wheels adapted for pivoting about a common vertical axis, a motor for selectively turning a power shaft, solenoid operated clutch means for selectively interconnecting said power shaft with said drive wheels, and switch means operatively connected with said handle means responsive to the force transmitted to said frame for engaging said clutch.

10. Apparatus according to claim 9, wherein the driven member of said clutch comprises the rim of one of said drive wheels.

11. Apparatus according to claim 9, including means for actuating said solenoid for energizing said clutch, comprising a slip ring mounted on said power shaft, said slip ring having a brush for cooperating therewith, and a conductor connected from said slip ring to said solenoid through an open keyway in said power shaft.

12. In a power operated vehicle, the combination comprising a handle connected to said vehicle for supplying manual motive power to said vehicle either by pushing or pulling thereon, and a switch mechanism disposed within said handle, said switch mechanism comprising a pair of switches, each of said switches being resiliently mounted with respect to said handle and responsive to a predetermined force transmitted by said handle to selectively provide discrete electrical signals, relay means operable in response to said signals, and clutch means for energizing a power assist mechanism in response to the signal derived from said switch.

13. In an industrial truck, the combination comprising a frame, a drive assembly pivotally connected to said frame including a shaft, a driven member rotatably mounted on said shaft, a driving member rotatably mounted on said shaft and juxtaposed with said driven member, a clutching member disposed between said driven and driving members, a clutch control member mounted on said driving member and adapted to move said clutching member between clutching and unclutching positions, electromechanical means mounted on said driving member for selectively actuating said clutch control, and switch means connected to said frame and operative to actuate said electromechanical means in response to a predetermined motive force applied to said frame.

14. In an industrial truck the combination comprising a frame, a drive assembly pivotally connected to said frame including a shaft, a drive wheel rotatably mounted on said shaft, a driving member rotatably mounted on said shaft, the rim of said drive wheel surrounding said driving member, a clutching member, said driving member having a peripheral flattened portion for accommodating said clutching member in the space thereby provided between said driving member and said rim, a clutch control member, said clutching member being positioned within said space by said clutch control member, said clutch control member having a first position with respect to said driving member but adapted to selectively assume a second position in which said clutching member is brought into engagement with both said driving member and said rim, electromechanical means for selectively causing said clutch control member to assume said second position, and switch means connected to said frame and operative to actuate said electromechanical means in response to a predetermined motive force applied to said frame.

References Cited by the Examiner
UNITED STATES PATENTS

| | | | |
|---|---|---|---|
| 2,138,129 | 11/1938 | Wolfram | 192—32 |
| 2,138,239 | 11/1938 | Irgens | 180—19 |
| 2,146,044 | 2/1939 | Wolfram | 192—32 |
| 2,410,818 | 11/1946 | Grant | 192—45 |
| 2,879,858 | 3/1959 | Thomas | 180—19 |
| 2,919,000 | 12/1959 | Claytor | 192—40 X |
| 3,015,744 | 1/1962 | Wesolowski | 310—234 |
| 3,043,388 | 7/1962 | Hansen | 180—19 |
| 3,090,459 | 5/1963 | Scudder | 180—19 |
| 3,164,234 | 1/1965 | Tamarin | 192—47 X |
| 3,225,853 | 12/1965 | Norton et al. | 180—19 |

BENJAMIN HERSH, *Primary Examiner.*

A. HARRY LEVY, *Examiner.*

J. A. PEKAR, *Assistant Examiner.*